G. C. BEEMAN & T. KELLEY.
DISINFECTING APPARATUS.
APPLICATION FILED DEC. 14, 1909.
1,036,782.
Patented Aug. 27, 1912.
2 SHEETS—SHEET 1.
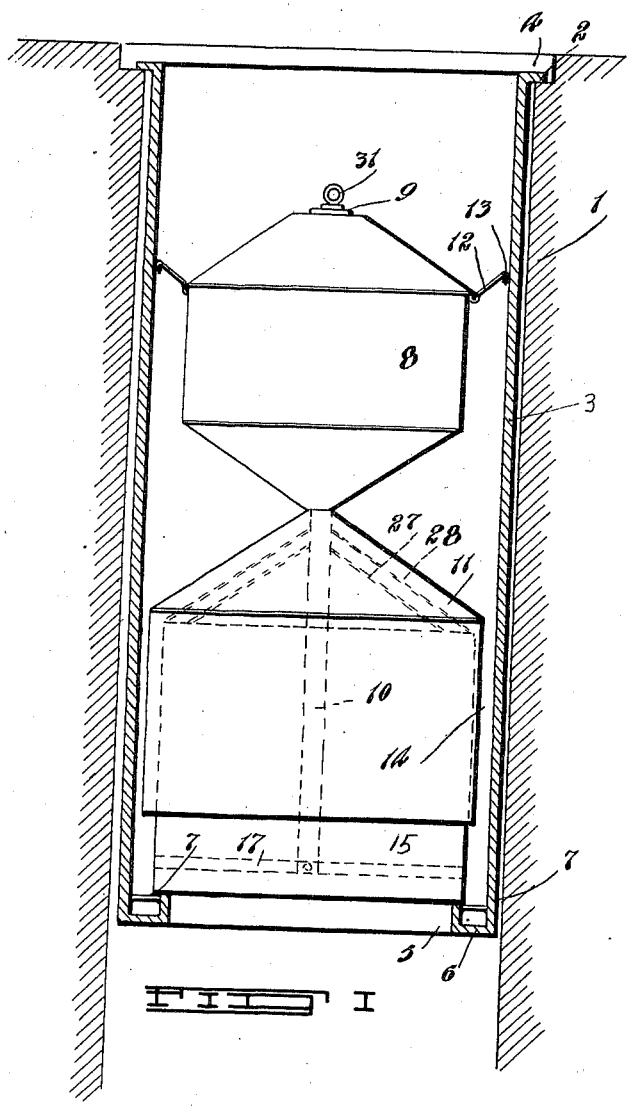

G. C. BEEMAN & T. KELLEY.
DISINFECTING APPARATUS.
APPLICATION FILED DEC. 14, 1909.
1,036,782.
Patented Aug. 27, 1912.
2 SHEETS—SHEET 2.
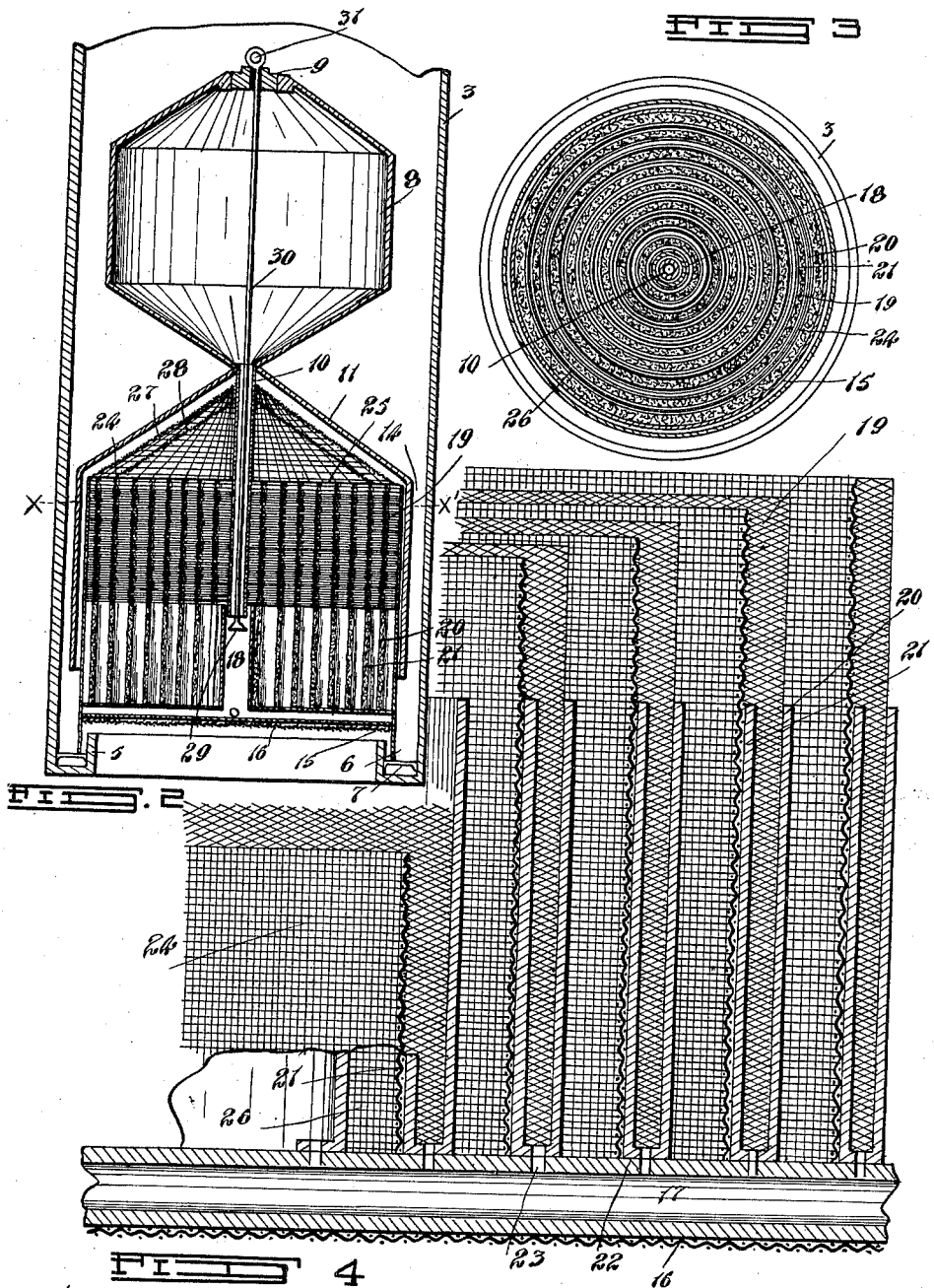

UNITED STATES PATENT OFFICE.

GEORGE CLARENCE BEEMAN AND THOMAS KELLEY, OF WINNIPEG, MANITOBA, CANADA.

DISINFECTING APPARATUS.

1,036,782.   Specification of Letters Patent.   Patented Aug. 27, 1912.

Application filed December 14, 1909. Serial No. 533,091.

*To all whom it may concern:*

Be it known that we, GEORGE CLARENCE BEEMAN and THOMAS KELLEY, both of the city of Winnipeg, in the Province of Manitoba, Canada, have invented certain new and useful Improvements in Disinfecting Apparatus, of which the following is the specification.

Our invention relates to an apparatus for disinfecting gases, particularly designed for insertion within the manholes of sewers for disinfecting sewer gases, and the object of the invention is to provide a simple, efficient apparatus of this class which can be readily placed in position, and which requires little attention when in use.

It consists essentially in a cylinder adapted to pass within a sewer manhole, a receptacle for the reception of a liquid disinfectant, said receptacle carrying a downwardly extending delivery tube and a flaring or funnel-shaped hood, a series of concentric wicks located beneath the hood and carried by arms communicating with the wicks and with a feed tube located beneath the delivery tube, there being air spaces between the wicks and gauze to the side above and below the wicks, the parts being arranged and constructed as hereinafter more particularly described.

Figure 1 is a side view of the apparatus as it appears when in use, the manhole appearing in vertical section. Fig. 2 is a vertical sectional view through the apparatus. Fig. 3 is a horizontal cross sectional view through the apparatus, the section being taken in the plane denoted by the line X X', Fig. 2. Fig. 4 is an enlarged detailed vertical sectional view through one of the arms and the wicks carried by the arms showing the manner in which the wicks are fed and supported.

In the drawings like characters of reference indicate corresponding parts in each figure.

1 represents the usual manhole of a sewer which is provided at the top with a flange 2 to receive the usual cover (not shown).

3 represents a cylinder having the upper end flanged outwardly at 4 and resting on the flange 2, and the lower end flanged inwardly and upwardly at 5, thereby forming an annular receptacle at 6 for the reception of a liquid such as water.

7 are brackets or straps passing across the annular receptacle 6 and fastened to the lower end of the cylinder.

8 is a receptacle or tank for the reception of a disinfecting liquid that which is employed in the present instance being formaldehyde which is inserted within the tank through a screw plug 9 which appears in the top of the receptacle.

10 is a delivery tube leading from the bottom of the receptacle, and 11 is a funnel-shaped hood which is secured to the tube and incloses the upper ends of the wicks hereinafter referred to. The receptacle is supplied with hooks 12 by which it is supported from eyes 13 carried by the cylinder 3. It is to be noticed that an annular opening 14 appears between the hood and the walls of the cylinder. In actual practice the width of this opening ranges somewhere in the neighborhood of one inch.

15 is a second open ended cylindrical shell which is adapted to rest with its lower edge bearing on the brackets 7 and with its upper edge well within the hood, it being noticed that the brackets 7 are located well toward the bottom of the annular receptacle 6.

16 is a horizontally disposed wire screen or gauze secured to the inner sides of the shell 15 and toward its lower end, the object of this gauze being to initially disintegrate or break up the gases rising from the sewer.

17 are four radially extending tubular arms which have their outer ends closed and their inner ends united and continuous with a vertically directed feed tube 18, which has its upper end fitting over the lower end of the tube 10.

19 are concentric wicks located around the tube 18, said wicks extending upwardly as high as the upper edge of the shell 15 and having their lower ends received each between two concentric plates 20 and 21 which are united at the bottom at 22 and are supported by the tubes 17. A duct 23 leads from the interior of the tubes 17 to the bottom of the wicks.

24 are concentric cylindrical screens of wire gauze which rest their lower ends bearing on the arms 17 and are placed immediately in the sides of the wicks 19 and extend the full height thereof. The upper ends of the screens are turned over metallic reinforcing rings 25 which in the present instance are formed from tin. A passageway 26 appears between the wicks through which the upwardly ascending sewer gases are passed.

27 and 28 are conically-shaped wire screens secured to the tube 10 and overhanging the upper ends of the wicks 19.

29 is a valve adapted to close the lower end of the tube 10, said valve being carried at the lower end of a rod 30 which passes upwardly through the screw plug 9, and is provided with a loop 31 by which it can be raised or lowered.

When the device is to be used the cylinder 3 is first placed in position within the manhole and then the lower portion of the apparatus including the shell 15 and the wicks are placed within the lower end of the cylinder resting on the brackets. The tank or receptacle, previously filled with formaldehyde is next suspended by means of the hooks and eyes from the cylinder with the hood passing over the shell, it being understood that the valve during this operation is closed. Water is thrown into the manhole and is fed down through the opening 14 to the annular receptacle 16 filling it, thereby forming a water seal between the interior of the shell 15 and the opening 14 at the bottom of the shell. When the valve is open the liquid passes downwardly through the delivery tube to the tubular arms 17, and through the openings 23 to the wicks where it is allowed to evaporate freely. The upcoming sewer gas is forced to pass through the passageways 26 and consequently becomes thoroughly mixed with the vapor thrown off by the wicks and is thoroughly disinfected thereby. Before reaching the surface of the roadway the disinfected gas is passed through the screens 27 and 28, being thoroughly disintegrated, and then escapes beneath the lower edge of the hood, and upwardly through the opening 14. The only attention which the apparatus will require is an occasional refilling of the tank with formaldehyde, and of the annular receptacle 6 with water. It is considered that the usual downfall of rain will supply sufficient water to keep the receptacle 6 filled, but in dry weather it might be found necessary for the attendant to fill it.

What we claim as our invention is:

1. An apparatus of the class described, comprising an open ended cylinder having its lower end turned inwardly and upwardly forming an annular liquid receiving receptacle, a cylindrical shell supported with its lower end suspended within the receptacle, a screen secured to and passing across the shell, radially extending and interconnected tubular arms carried by the screen, spaced absorbent means extending upwardly within the cylindrical shell and having their lower ends received each between opposing plates, said plates being united at their lower edges and having openings therein communicating with openings provided in the tubular arms, and means for feeding a disinfectant, to the tubular arms, as and for the purpose specified.

2. An apparatus of the class described, comprising an open ended cylinder having its lower end turned inwardly and upwardly forming an annular liquid receiving receptacle, a cylindrical shell supported with its lower end suspended within the receptacle, a screen secured to and passing across the shell, radially extending and interconnected tubular arms carried by the screens, a vertically directed tube communicating with the tubular arms, a plurality of concentric spaced wicks located around the vertically directed tube and having their lower ends received each between two concentric plates which are united at their lower ends and are provided with openings which register with further openings located in the tubular arms, concentric cylindrical wire screens adjacent to the sides of the wicks, means for feeding a disinfectant to the vertically directed tube, a hood closing over the upper ends of the wicks, and conically shaped wire screens within the hood and overhanging the wicks, as and for the purpose specified.

Signed at Winnipeg, this 28th day of November 1911.

GEORGE CLARENCE BEEMAN.

In the presence of—
G. S. ROXBURGH,
J. K. ELKIN.

Signed at Toronto, in the Province of Ontario, this 9 day of Nov. 1909.

THOMAS KELLEY.

In the presence of—
B. BOYD,
R. COBAIN.

---

Copies of this patent may be obtained for five cents each, by addressing the "Commissioner of Patents, Washington, D. C."